3,203,757
PROCESS FOR THE PRODUCTION OF
POTASSIUM SULFATE
Hans Henne, Kassel-Wilh., and Kurt Ratsch, Wolfershausen, Werra, Germany, assignors to Wintershall Aktiengesellschaft, Kassel, Germany
Filed May 3, 1962, Ser. No. 192,224
Claims priority, application Germany, May 5, 1961,
W 29,940
13 Claims. (Cl. 23—121)

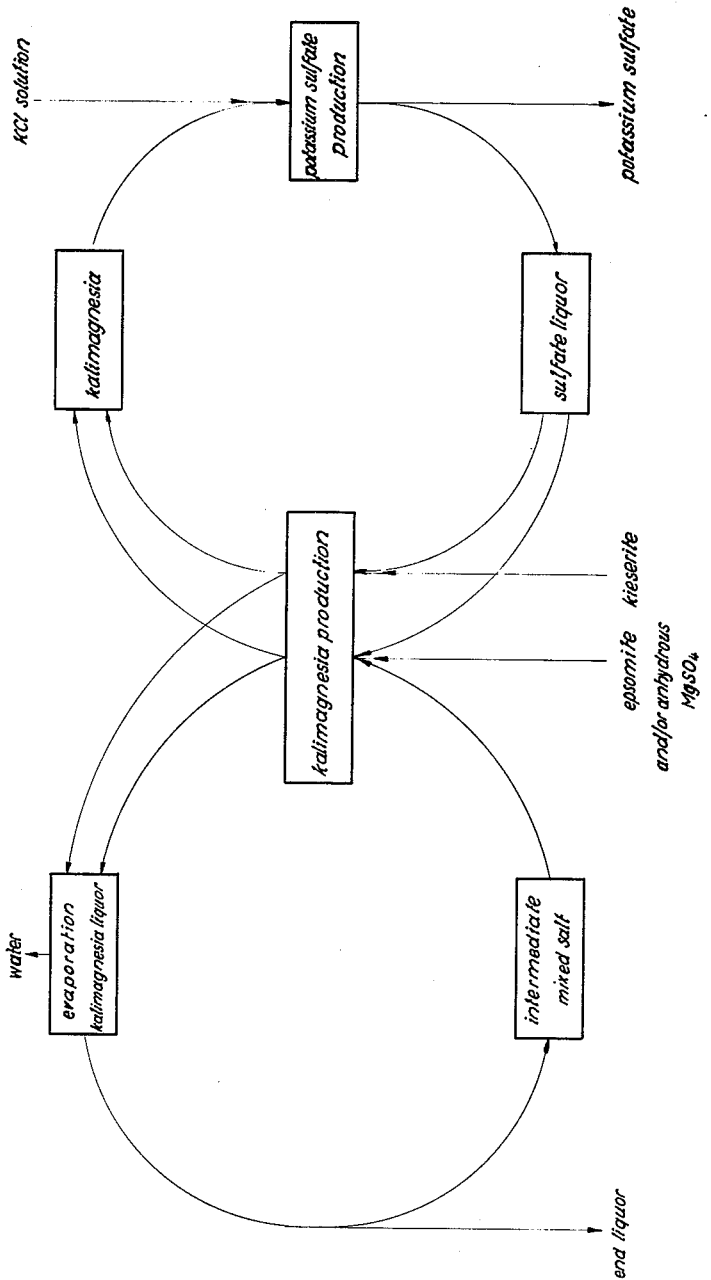

This invention is concerned with an improved process for the production of potassium sulfate.

It is an object of the present invention to provide an improved process for the production of potassium sulfate, which is essentially self-contained in that the byproducts and liquors produced during the process can be recycled in the process with the exception of an exhausted waste liquor which can be discarded.

It is more particularly an object of the invention to provide a process for the production of potassium sulfate which avoids the formation of excessive amounts of mother liquors, the disposal of which requires additional recovery steps complicating the process.

It is yet another object of the present invention to provide a process for the production of potassium sulfate which is essentially self-contained as described above, which avoids the formation of excessive amounts of mother liquors, and which avoids, at the same time, the formation of difficultly separable precipitates which complicate the separation, and particularly the filtration thereof, and cause losses of potassium values in the separated liquors of prior processes.

Potassium sulfate is conventionally produced by reacting potassium chloride in aqueous solution with kieserite or epsomite (i.e., magnesium sulfate with one or with seven moles of water of crystallization), which leads to the formation, as an artificial intermediary product, of a "double sulfate of potash-magnesia," also known as "kalimagnesia" which has the approximate composition $K_2SO_4 \cdot MgSO_4 \cdot 6H_2O$. Potassium sulfate is then obtained from the aforesaid double sulfate by reaction with potassium chloride, and the entire process can be formulated in a simplified manner as follows:

(a) $2KCl + 2MgSO_4 = K_2SO_4 \cdot MgSO_4 + MgCl_2$ (b) $K_2SO_4 \cdot MgSO_4 + 2KCl = 2K_2SO_4$
  $+ MgCl_2$ dissolved ("sulfate liquor")

disregarding, in the above equations, the water of crystallization.

In order to distinguish the above-mentioned artificial potassium-magnesium sulfate from the naturally occurring double sulfate known as "schönite," the artificial product shall be referred to hereinafter in the specification and claims as "kalimagnesia" (see Remy, "Treatise on Inorganic Chemistry" (1956), vol. I, page 279).

Schönite is usually accompanied by rock salt, kainite and other admixtures while kalimagnesia is free therefrom. The use of the two salt materials in the production of potassium sulfate, therefore, presents considerably different problems.

One important problem arising in all of the known processes for the production of potassium sulfate consists of finding ways to reutilize the so-called sulfate liquor which is produced in the reaction of aqueous solution of potassium chloride with kalimagnesia as a by-product from which the crystallized potassium sulfate has been separated. This sulfate liquor contains a considerable amount of valuable potassium salt together with magnesium salt and other impurities.

One earlier process comprises the recovery of the potassium values contained in the sulfate liquor by reacting one part of the total amount of the latter obtained in a given run, with kieserite, and the remaining part of the liquor with kainite and water. The kainite required for this conversion is produced as an intermediary product, in the recovery of an intermediately formed carnallite-containing mixed salt produced by evaporation of a considerable portion of water from the kalimagnesia liquor itself, or from another salt liquor of suitable composition, and reaction of the intermediate mixed salt with anhydrous magnesium sulfate or with epsomite. This recovery process also yields a final waste liquor with a low potassium chloride content.

When carrying out this recovery process on an industrial scale, it was found that the intermediately formed kainite was difficult to separate from the adhering kainite mother liquor and showed a strong tendency to leak in considerable amounts through the centrifuges and the like separating apparatus conventionally used in the potassium salt industry, thereby causing undue losses of potassium values.

This drawback is avoided, and the above stated objects attained, in the continuous process for the production of potassium sulfate by reaction of potassium chloride with kalimagnesia according to the present invention, which shall now be explained in detail in connection with the flow diagram shown in the accompanying drawing, and which comprises (a) Mixing potassium chloride in aqueous solution with kalimagnesia in a molar ratio of substantially 1:2, whereby potassium sulfate and a sulfate liquor are formed by the ensuing reaction, and separating said potassium sulfate from said sulfate liquor, (b) Mixing a given portion of the total amount of said sulfate liquor with kieserite, whereby a first portion of kalimagnesia and a first mother liquor are produced by the ensuing reaction of a temperature of 50–80° C., (c) Mixing the remaining portion of the said total amount of sulfate liquor with a member selected from the group consisting of anhydrous magnesium sulfate and epsomite, and with an intermediate mixed salt obtained in a previous run in step (f) below, whereby another portion of kalimagnesia and a second mother liquor are obtained in the ensuing reaction at a temperature of about 40–60° C., (d) Separating said portions of kalimagnesia from said first and second mother liquors and combining the latter, (e) Evaporating about 30 to 50%, and preferably 45 to 50%, of the weight of said combined mother liquors, thereby forming a precipitate of said intermediate mixed salt in an end liquor poor in potassium chloride, (f) Separating said intermediate mixed salt from said end liquor and introducing the former into reaction with said remaining portion of sulfate liquor in step (c), and (g) Introducing the portions of kalimagnesia obtained in step (d) into the reaction with further potassium chloride in step (a), thereby obtaining a yield rate of potassium sulfate of about 95% and higher, calculated on the amount of potassium chloride, being introduced in the form of aqueous KCl-starting solution.

As shown in the accompanying flowsheet, the first step (a) of the process according to the invention is the following:

Potassium chloride in aqueous solution is reacted with kalimagnesia, with stirring at about 30° to 60° C., and preferably at 45° to 50° C., for from about 5 to 60 minutes, and preferably about 20 to 30 minutes. Reaction times and temperatures in this and all following process steps depend, of course, on the exact composition of the materials and liquors involved, and vary according to that composition within the stated limits.

The resulting reaction mixture is separated by filtration, and there are obtained crystallized potassium sulfate as the desired end product, and a mother liquor referred to hereinafter as "sulfate liquor."

The aqueous potassium chloride solution which is introduced into the process according to the invention has preferably a concentration of about 320 to 340 g./l., without being, of course, strictly limited to this range. It usually contains from 4 to 6 g./l. of sodium chloride, the balance being made up of 846 to 840 g./l. of water resulting in a density of the solution ranging from about 1170 to 1186 g./l.

The kalimagnesia which is produced during the process and brought into reaction with the aforesaid potassium chloride solution should have a composition, in percent by weight of, as given below under (I), and the resulting potassium sulfate has a composition, also in percent by weight, as given below under (II).

| Component | (I) Kalimagnesia, percent | (II) Potassium Sulfate, percent |
|---|---|---|
| $K_2SO_4$ | 29 to 33 | 74.8 to 86.2 |
| KCl | 15 to 8 | 3.7 to 2.0 |
| $MgCl_2$ | 6 to 2 | 1.0 to 1.3 |
| $MgSO_4$ | 23 to 32 | 5.0 to 1.6 |
| NaCl | | 0.8 to 0.0 |
| $H_2O$ | 29 to 23 | 14.7 to 8.9 |

In the case of KCl-concentration as indicated above, the amounts of potassium chloride solution, kalimagnesia and, if necessary, water are so adjusted that the resulting total amount of sulfate liquor is held within the limits of about 1100 to 1400 m.³ for every cubic meter (m.³) of potassium chloride solution, or within the limits of about 2750 to 3500 m.³ and preferably between 2900 and 3300 m.³ for an average amount of 2500 m.³ of said solution.

This sulfate liquor has the following composition:

| | G./l. |
|---|---|
| KCl | 214 to 230 |
| $MgCl_2$ | 95 to 80 |
| $MgSO_4$ | 65 to 75 |
| NaCl | 3 to 23 but preferably 3 to 5 |
| $H_2O$ | 864 to 850 |
| Density | 1,241 to 1,244 |

The portion of this sulfate liquor to be subjected to the treatment of step (b) above is about 900 to 1150 m.³ out of the last-mentioned total amount of 2900 to 3300 m.³.

The remaining portion of the sulfate liquor which is subjected to the treatment according to step (c) above, should be in the range of 1800 to 2250 m.³.

A preferred ratio of the amount of the first portion of sulfate liquor, being introduced into step (b), to the remaining portion, being introduced into step (c), is (930 to 940):(2080 to 2090), i.e., a total of 3010 to 3030 m.³ of sulfate liquor should be obtained from about 2500 m.³ of aqueous potassium chloride solution. When these limits are observed, it is possible to carry out the process so that practically no excess or deficit of sulfate liquor and kalimagnesia occurs in the continuous process.

In accordance with step (b) the above-defined first portion of the sulfate liquor is reacted with kieserite, at a temperature of about 50° to 80° C., and preferably 60° to 70° C., for about 1 to 4 hours, and preferably 2 to 3 hours, under stirring, whereby there is obtained a slurry of kalimagnesia which is separated from its mother liquor by filtration.

According to step (c) the remaining portion of sulfate liquor is heated with epsomite, anhydrous magnesium sulfate, or a mixture of both, and with the intermediate mixed salt produced from step (e) as described in more detail below, at a temperature of about 40° to 60° C., and preferably at about 50° C. until the reaction is essentially complete, which is the case in about 0.5 to 3 hours, whereby kalimagnesia is formed and, after separation of the same, a second amount of kalimagnesia mother liquor is obtained which is combined with the kalimagnesia mother liquor resulting from step (b) above.

For every 2000 m.³ of sulfate liquor, about 1000 tons of epsomite (or stoichiometrically corresponding amounts of anhydrous magnesium sulfate or mixtures of the latter with epsomite), and about 1000 tons of moist intermediate mixed salt, the water content of which is in the range of about 20 to 35%, are added.

By varying the relative amount of reactants in the above conversion of sulfate liquor, epsomite and intermediate mixed salt to kalimagnesia, it is possible to determine the content of magnesium chloride on the one hand, and potassium chloride on the other hand, in the kalimagnesia mother liquor which remains after separation of the formed kalimagnesia from the reaction mixture, a liquor poorer in KCl and of correspondingly higher $MgCl_2$-content being desired, without increasing the amount of water that must be removed in the step (d) to be described hereafter.

Consequently, the relative proportions of intermediate mixed salt and epsomite can be varied in the ratio of, for instance, 1:1, 1:1.2, or 1:1.4, and intermediate values.

The kalimagnesia separated in step (d) from its mother liquor has a moisture content ranging from about 23 to 30% and preferably about 27%.

Typical analyses of epsomite and of anhydrous magnesium sulfate as used in the process according to the invention are given below (in percent by weight):

| | Epsomite | $MgSO_4$ |
|---|---|---|
| $MgSO_4$ | 48.2 | 98.0 |
| Impurities | 0.3 | 0.5 |
| $H_2O$ | 51.5 | 1.5 |
| | 100.0 | 100.0 |

The combined kalimagnesia mother liquors resulting from step (d) have an average composition within the following ranges:

| | G./l. |
|---|---|
| KCl | 90 to 65 |
| $MgCl_2$ | 200 to 250 |
| $MgSO_4$ | 90 to 95 |
| NaCl | 30 to 10 |
| $H_2O$ | 875 to 880 |
| Density | 1,285 to 1,305 |

The evaporation step (e) is carried out preferably in the following manner. About 35 to 30% of the total amount of the combined kalimagnesia liquors is evaporated at temperatures above 100° C., particularly at 145° C., and a further amount of 5 to 10% of the weight of liquor is removed in a known manner by cooling under reduced pressure, so that, preferably about 34% of the introduced liquor is removed in the form of water. The reduced pressure applied is usually about 450 to 50 torr.

As mentioned above, the combined kalimagnesia liquors which are subjected to the above-described evaporation treatment should possess a magnesium chloride content of 200 to 250 grams per liter (g./l.), preferably 220 to 230 g./l., and the magnesium chloride content after evaporation of water from the liquors in the above-described treatment should be about 400 to 460 g./l., and preferably about 400 to 420 g./l.

The composition of the intermediate mixed salt formed in step (e) depends on the degree of evaporation, i.e., the rate of concentration of the combined kalimagnesia liquors. The mixed salt accordingly contains varying amounts of carnallite, langbeinite, potassium chloride, sodium chloride, and, in certain cases, bischofite.

The analysis shows values, in percent by weight, of the following ranges:

|  | Percent |
|---|---|
| $K_2SO_4$ | 3 to 12 |
| KCl | 18 to 10 |
| $MgCl_2$ | 21 to 24 |
| $MgSO_4$ | 14 to 23 (or up to about 23) |
| NaCl | 8 to 2 |
| $H_2O$ | 36 to 32 (thereof 8 to 10% moisture) |
|  | 100 to 100 |

The reaction of this intermediate salt with epsomite and/or anhydrous magnesium sulfate permits a far-reaching controlled variation of the amounts of mixed salts being continuously produced in the process according to the invention.

The end liquor, from which kalimagnesia has been separated, is poor in potassium values, while containing substantial amounts of magnesium salts, as shown by the following composition:

|  | G./l. |
|---|---|
| KCl | 10 to 5 |
| $MgCl_2$ | 400 to 460 |
| $MgSO_4$ | 45 to 41 |
| NaCl | 10 to 5 |
| $H_2O$ | 865 to 850 |
| Density | 1,330 to 1,351 |

Anhydrous magnesium sulfate, which can be used in this stage of the process, is advantageously obtained by the calcination of kieserite, and is also referred to as "calcined kieserite." Prior to its calcination, the kieserite must be purified, preferably by flotation with conventional floating agents, whereby a product of lower anhydrite content than in commercially available kieserite is obtained.

An important advantage of the process according to the invention resides in the fact that the concentrated kalimagnesia liquors which have been combined and treated as described under step (e) above need not be reacted with a magnesium sulfate, either anhydrous or containing water of crystalization, to form difficultly separable kainite. Rather, the intermediate stage of forming kainite is completely eliminated and the mixed salt obtained by evaporation of water from the aforesaid combined kalimagnesia liquors is reacted directly with epsomite to kalimagnesia which, in turn, is directly available for the reaction with fresh potassium chloride solution to form additional potassium sulfate. The intermediately produced mixed salt of evaporation step (e) is coarser crystalline than the very fine-grained kainite and can therefore be separated from its mother liquor, namely the above-mentioned KCl-poor waste liquor, in the conventional centrifuges or the like apparatus, with considerably lesser amounts of mother liquor adhering to the separated crystals of mixed salts and greatly reduced losses of potassium values caused by leakage of salt through the centrifuge.

Another important technical advantage which contributes to a considerable degree to rendering the entire process according to the invention highly economical, resides in the possibility of varying the components in the conversion of the sulfate liquors with epsomite and/or anhydrous magnesium sulfate and the aforesaid intermediate mixed salt to kalimagnesia, and in the further possibility of adjusting the water content of the kalimagnesia which results from the aforesaid reaction, whereby the process according to the invention can be steered in such a manner that in the overall process of the production of potassium sulfate, there occurs neither an excess nor a deficit of sulfate liquor.

This process according to the invention thus makes it possible to obtain very high yields of potassium sulfate from potassium chloride solutions, epsomite (and/or anhydrous magnesium sulfate) and kieserite, in particular in finely ground form, with production of a waste liquor which is poor in potassium chloride, and without the necessity of producing kainite as an intermediary.

In a preferred mode of operation, epsomite alone is used instead of a mixture of anhydrous magnesium sulfate and epsomite, for the reaction with the intermediate mixed salt obtained by evaporation of water according to step (d) above. Due to the high content of water of crystallization in epsomite, this constitutes an additional introduction of water into the overall process which is permissible, because no water is required for the decomposition of kainite, in contrast to the mode of operation according to the above-described earlier recovery process involving the intermediate production of kainite. The end liquor poor in potassium chloride which is obtained as a by-product in the process according to the invention is removed from the continuous process of potassium sulfate production.

The process according to the invention is further illustrated, but not limited, by the following examples in which all parts and percentages are by weight unless otherwise stated, and all temperatures are in degrees centrigrade; tons are metric tons (t).

In all above-described stages of the process according to the invention, the various liquors occurring therein should preferably not deviate by more than 10% from the corresponding values at which no excess and no deficit of sulfate liquor occurs in the overall process, which values are illustrated in the examples below.

*Example 1*

1850 tons of kalimagnesia which has approximately the following composition: 33% $K_2SO_4$; 8% KCl; 26% $MgSO_4$; and 29% $H_2O$, the balance being impurities, was added to 2250 m.³ of aqueous potassium chloride solution, and reacted with each other in a conventional manner, for instance, by stirring the resulting mixture in a reactor vessel for about 20 to 30 minutes with heating at a temperature of about 45° to 50° C.; the resulting slurry is separated, for instance, in a pressure filter, whereby there were obtained 1060 tons of potassium sulfate ($K_2SO_4$ content 89 to 90%) and 3239 m.³ of sulfate liquor which consisted of about

|  | g./l. |
|---|---|
| KCl | 230 |
| $MgCl_2$ | 82 |
| $MgSo_4$ | 67 |
| NaCl | 23 |
| $H_2O$ | 850 |

Two-thirds of this sulfate liquor (about 2150 m.³) were mixed with 1078 tons of epsomite and about 1000 tons of moist mixed salt and heated at about 50° to obtain a first amount of kalimagnesia. The remaining third of the sulfate liquor was mixed with 254 tons of finely ground kieserite (average particle size about 90 microns) and treated at 60° C. to 70° C. with stirring for 2 hours.

The resulting slurry was filtered, and the separated kalimagnesia was combined with the kalimagnesia obtained from the first-mentioned portion of sulfate liquor. A total of about 1850 tons of kalimagnesia was obtained, after separation, in a pressure filter of conventional structure, from the kalimagnesia mother liquor. About 3106 m.³ of the latter were obtained which contained about 75 g./l. of KCl, 231 g./l. of $MgCl_2$, 92 g./l. of $MgSO_4$ and 18 g./l. of NaCl. This liquor was first heated to 100°, whereby water amounting to about 25 to 30% of the weight of the liquor was evaporated, and the concentrated liquor was then cooled under reduced pressure of 450–50 torr until a total of 1472 m.³ of water had been removed. There were obtain 1000 tons of mixed salt of the following composition, in percent by weight:

| | |
|---|---|
| $K_2SO_4$ | 4.8 |
| KCl | 17.1 |
| $MgCl_2$ | 22.7 |
| $MgSo_4$ | 16.6 |
| NaCl | 3.8 |
| $H_2O$ | 34.8 | and, furthermore, after separation of this salt, for instance, by centrifuging, 1167 m.³ of waste liquor containing only about 5 g./l. of KCl besides 460 g./l. of $MgCl_2$.

The mixed salt was introduced into reaction with further sulfate liquor and epsomite.

In further runs, the magnesium chloride content of the kalimagnesia liquor varied between 210 and 240 g./l. and that of the sulfate liquor between about 80 and 90 g./l. With equal amounts of the other reactants, the volume of sulfate mother liquor, given above as 3239 m.³, varied between about 3000 and 3500 m.³.

The carnallite contained in the intermediate mixed salt is converted, with the latter, directly to kalimagnesia in the reaction with epsomite and/or $MgSo_4$. The process according to the invention does, therefore, not comprise any separate carnallite cycle which characterizes other proposed processes. The carnallite phase appears only as a transitory one, in the mixed intermediate salt, as a component of the latter.

*Example 2*

All reaction conditions are the same as those described in Example 1 for the different stages of the process, unless stated otherwise.

2508 m.³ of an aqueous potassium chloride solution containing 332 g./l. of KCl are diluted with 250 m.³ of water and 1736 tons of kalimagnesia produced in a previous run are added thereto, which kalimagnesia contains about 33% of $K_2SO_4$, 9% of KCl, 4% of $MgCl_2$ and about 25% of water and 28% of $MgSo_4$. About 1109 tons of potassium sulfate and 3023 m.³ of sulfate liquor are obtained, which have the following compositions, respectively:

| | Potassium Sulfate (percent by weight) | Sulfate liquor (g./l.) |
|---|---|---|
| $K_2SO_4$ | 79.4 | |
| KCl | 2.9 | 219 |
| $MgCl_2$ | 1.2 | 84 |
| $MgSO_4$ | 3.7 | 67 |
| $H_2O$ | 12.0 | 863 |
| Impurities | 0.8 | |
| | 100.0 | |

The potassium value of the potassium sulfate calculated as $K_2O$ is 50.8%.

2087 m.³ of the above amount of sulfate liquor are mixed with 1010 tons of epsomite and with 1000 tons of moist mixed salt obtained in a similar manner as described below, in a previous run, and are heated to 40° to 60°, and as closely as possible to 50°, whereby 1249 tons of kalimagnesia is formed which is separated as described in Example 1. The remaining portion of 936 m.³ is reacted with 313 tons of kieserite, as described in Example 1, to form 487 tons of kalimagnesia. The combined amounts of 1736 tons of kalimagnesia are introduced into another cycle with fresh KCl-solution.

About 2319 m.³ of kalimagnesia mother liquor are obtained from the first, and about 939 m.³ of the mother liquor from the reaction with the second portion of sulfate liquor. The combined 3258 m.³ of kalimagnesia mother liquors consist of

| | g./l. |
|---|---|
| KCl | 73 |
| $MgCl_2$ | 217 |
| $MgSO_4$ | 94 |
| $H^2O$ | 874 |

From this liquor, about 1526 m.³ of water are evaporated in the manner described in Example 1, and a moist mixed salt having the following composition, in percent by weight, is obtained:

| | |
|---|---|
| $K_2SO_4$ | 7.6 |
| KCl | 17.7 |
| $MgSO_4$ | 22.8 |
| $H_2O$ | 32.2 |

After separation of this salt from the reaction mixture, there are left 1325 m.³ of an end liquor containing about 10 g./l. of KCl and 403 g./l. of $MgCl_2$, which end liquor is removed from the process.

The overall yield of potassium value, calculated on the basis of the amount of $K_2O$ being introduced into the process, is 98.4%.

In practicing the process in the manner described in this example, there is practically no excess or deficit of sulfate liquor.

*Example 3*

The reaction conditions of Example 1 are applied in this example except where stated otherwise.

2495 m.³ of a potassium chloride solution having a KCl content of 332 g./l., 280 m.³ of water and 1742 tons of kalimagnesia, produced in a previous run and consisting of 33% of $K_2SO_4$, 10% of KCl, 4% of $MgCl_2$, 27% of $MgSO_4$ and 25% of $H_2O$. 1092 tons of potassium sulfate consisting, in percent by weight of

| | |
|---|---|
| $K_2SO_4$ | 85.6 |
| KCl | 2.0 |
| $MgCl_2$ | 1.0 |
| $MgSO_4$ | 1.6 |
| $H_2O$ | 8.9 |
| Impurities | 0.9 |
| | 100.0 | and containing 52.2% of potassium values calculated as $K_2O$, is obtained, as well as 3095 m.³ of sulfate liquor which consists of 219 g./l. of KCl, 84 g./l. of $MgCl_2$, 67 g./l. of $MgSO_4$ and 863 g./l. of $H_2O$.

A first portion of 1973 m.³ of this sulfate liquor is reacted with 759 tons of epsomite and 1062 tons of a mixed salt produced during a previous run (the weight ratio of epsomite to mixed salt being 1:1.4), whereby 1158 tons of kalimagnesia and 2062 m.³ of kalimagnesia liquor are obtained.

The remaining portion of 1122 m.³ of sulfate liquor is reacted with 376 tons of kieserite, whereby 584 tons of kalimagnesia and 1226 m.³ of kalimagnesia liquor are obtained.

The combined amounts of kalimagnesia, totalling 1742 tons, i.e., the same amount as consumed in the above described run, are used for another run with fresh aqueous potassium chloride solution.

The combined kalimagnesia liquors totalling 3288 m.³ consist of about 69 g./l. of KCl, 228 g./l. of $MgCl_2$, 92 g./l. of $MgSO_4$ and 880 g./l. of $H_2O$.

The volume of the combined kalimagnesia liquors is reduced by evaporation of 1499 m.³ of water, whereby 1062 tons of a mixed salt having the following composition, in percent by weight:

| | |
|---|---|
| $K_2SO_4$ | 9.4 |
| KCl | 12.7 |
| MgCl | 22.4 |
| $MgSO_4$ | 17.2 |
| $H_2O$ | 34.5 |
| Other salts (NaCl) | 3.8 |
| | 100.0 | and 1230 m.³ of an end liquor containing 5 g./l. of KCl and 460 g./l. of $MgCl_2$ are obtained.

The mixed salt is introduced into another run for conversion to kalimagnesia and the end liquor is removed from the process.

The low content of the end liquor in potassium values guarantees for this example a potassium yield, calculated as $K_2O$ based on the content thereof in the introduced potassium chloride solution, of about 99.3%.

*Example 4*

Example 1 is repeated using a mixture of 850 tons of epsomite and 107 tons of anhydrous magnesium sulfate and substantially identical results are obtained.

*Example 5*

Example 1 is repeated with 506 tons of anhydrous magnesium sulfate instead of 1078 tons of epsomite and substantially identical results are obtained.

What is claimed is:

1. In a continuous process for the production of potassium sulfate by reaction of potassium chloride in aqueous solution with kalimagnesia,
   the improvement comprising
   (a) mixing about one-third of the total amount of sulfate liquor which is obtained from an extraneous reaction of potassium chloride with kalimagnesia and subsequent separation of the resulting potassium sulfate from the reaction mass, with kieserite at a temperature of about 50 to 80° C., whereby a first portion of kalimagnesia and a first mother liquor are produced in the ensuing reaction,
   (b) mixing the remaining portion of the aforesaid total amount of sulfate liquor with a member selected from the group consisting of anhydrous magnesium sulfate and epsomite, and with an intermediate mixed salt obtained in a previous run in step (e) below, at about a temperature of 40 to 60° C., whereby another portion of kalimagnesia and a second mother liquor are obtained in the ensuing reaction,
   (c) separating said portions of kalimagnesia from said first and second mother liquors and combining the latter,
   (d) evaporating about 30 to 50% of the weight of said combined mother liquors, thereby forming a precipitate of said intermediate mixed salt in an end liquor poor in potassium chloride, and
   (e) separating said intermediate mixed salt from said end liquor and introducing the former into reaction with said remaining portion of sulfate liquor in step (b).

2. A continuous process for the production of potassium sulfate, comprising
   (a) mixing potassium chloride in aqueous solution with kalimagnesia in a molar ratio of substantially 1:2, whereby potassium sulfate and a sulfate liquor are formed by the ensuing reaction, and separating said potassium sulfate from said sulfate liquor,
   (b) mixing one-third of the total amount of said sulfate liquor with kieserite at a temperature of about 50 to 80° C., whereby a first portion of kalimagnesia and a first liquor are produced by the ensuing reaction,
   (c) mixing the remaining portion of the said total amount of sulfate liquor with a member selected from the group consisting of anhydrous magnesium sulfate and epsomite, and with an intermediate mixed salt obtained in a previous run in step (f) below, at a temperature of about 40 to 60° C., whereby another portion of kalimagnesia and a second mother liquor are obtained in the ensuing reaction,
   (d) separating said portions of kalimagnesia from said first and second mother liquors and combining the latter,
   (e) evaporating about 30 to 40% of the weight of said combined mother liquors, thereby forming a precipitate of said intermediate mixed salt in an end liquor poor in potassium chloride,
   (f) separating said intermediate mixed salt from said end liquor and introducing the former into reaction with said remaining portion of sulfate liquor in step (c), and
   (g) introducing the portions of kalimagnesia obtained in step (d) into the reaction with further potassium chloride in step (a), thereby obtaining a yield rate of potassium sulfate of about 95% and higher, calculated on the amount of potassium chloride.

3. The improvement described in claim 1, wherein the magnesium chloride content of the combined kalimagnesia mother liquors resulting from step (c) is in the range of about 200 to 250 grams per liter, and the magnesium chloride content of the sulfate liquor introduced into reaction of steps (a) and (b) is about 80 to 95 grams per liter.

4. The improvement as described in claim 1, wherein the amount of liquors occurring in the several stages of the process deviates at most by about 10% from that value at which no excess and no deficit of sulfate liquor occurs in the overall process.

5. The improvement described in claim 2, wherein the reactants of step (a) are so adjusted that a total amount of about 3010 to 3030 m.³ of sulfate liquor are produced per 2500 m.³ of an aqueous potassium chloride solution having a KCl-content of about 320 to 340 grams per liter, and wherein from about 930 to 940 m.³ of the aforesaid total amount of sulfate liquor are introduced into step (b) for reaction with kieserite, and about 2080 to 2090 m.³ of the aforesaid total amount are introduced into step (c) for reaction with the said member and with said intermediate mixed salt.

6. The improvement described in claim 2, wherein the reactants of step (a) are so adjusted that a total amount of about 2900 to 3500 m.³ of sulfate liquor are produced per 2500 m.³ of an aqueous potassium chloride solution having a KCl-content of about 320 to 340 grams per liter, and wherein from about 900 to 1150 m.³ of the aforesaid total amount of sulfate liquor are introduced into step (b) for reaction with kieserite and about 1800 to 2250 m.³ of the aforesaid total amount are introduced into step (c) for reaction with the said member and with said intermediate mixed salt.

7. The improvement described in claim 1, wherein the reaction of sulfate liquor with kieserite in step (a) is carried out a temperature of about 60° to 70° C.

8. The improvement described in claim 1, wherein the reaction of sulfate liquor according to step (b) with said member and with said intermediate mixed salt is carried out at a temperature of about 50° C.

9. In a continuous process for the production of potassium sulfate by reaction of potassium chloride in aqueous solution with kalimagnesia,
   the improvement which comprises
   (a) reacting one-third of the total amount of sulfate liquor which is obtained from the reaction of potassium chloride with kalimagnesia and subsequent separation of the resulting potassium sulfate from the reaction mass, with kieserite at a temperature of about 50° to 80° C., whereby a first portion of kalimagnesia and a first mother liquor are produced, (b) reacting the remaining portion of the aforesaid total amount of sulfate liquor with epsomite with an intermediate mixed salt obtained in a previous run in step (e), below, at a temperature of about 40° to 60° C., whereby another portion of kalimagnesia and a second mother liquor are obtained, (c) separating said portions of kalimagnesia from said first and second mother liquors and combining the latter, (d) evaporating about 30 to 50% of the weight of said combined mother liquors, thereby forming a precipitate of said intermediate mixed salt in an end liquor poor in potassium chloride, and (e) separating said intermediate mixed salt from said end liquor and introducing the former into reaction with said remaining portion of sulfate liquor in step (b).

10. In a continuous process for the production of potassium sulfate by reaction of potassium chloride in aqueous solution with kalimagnesia, the improvement which comprises:
(a) reacting about one-third of the total amount of sulfate liquor which is obtained from an extraneous reaction of potassium chloride with kalimagnesia and subsequent separation of the resulting potassium sulfate from the reaction mass, with kieserite at a temperature of about 50 to 80° C., whereby a first portion of kalimagnesia and mother liquor are produced, (b) reacting the remaining portion of the aforesaid sulfate liquor with a mixture of one part by weight of a member selected from the group consisting of anhydrous magnesium sulfate and epsomite, and 1 to 1.4 parts by weight of an intermediate salt obtained in a previous run in step (e) below, at a temperature of about 40 to 60° C., whereby a second portion of the kalimagnesia and mother liquor are obtained, (c) separating said portions of kalimagnesia from said mother liquors which have a magnesium chloride content of about 200 to 250 grams per liter, and recycling the kalimagnesia into step (a), (d) evaporating about 30 to 50% by weight, of the water in said mother liquors wherein 30 to 35% of the water is evaporated at a temperature of about 100° to 145° C. and about 5 to 15% of the water is removed by cooling under reduced pressure, thereby forming a precipitate of said intermediate mixed salt and an end liquor containing very little potassium chloride and about 400 to 460 grams per liter of magnesium chloride, (e) separating said intermediate mixed salt from said end liquor and recycling the mixed salt into step (b).

11. In a continuous process for the production of potassium sulfate by reaction of potassium chloride in aqueous solution with kalimagnesia, the improvement which comprises:
(a) reacting about one-third of the total amount of sulfate liquor which is obtained from an extraneous reaction of potassium chloride with kalimagnesia and subsequent separation of the resulting potassium sulfate from the reaction mass, with kieserite at a temperature of about 50 to 80° C., whereby a first portion of kalimagnesia and mother liquor are produced, (b) reacting the remaining portion of the aforesaid sulfate liquor with a mixture of one part by weight of anhydrous magnesium sulfate and 1 to 1.4 parts by weight of an intermediate salt obtained in a previous run in step (e) below, at a temperature of about 40 to 60° C., whereby a second portion of kalimagnesia and mother liquor are obtained, (c) separating said portions of kalimagnesia from said mother liquors which have a magnesium chloride content of about 200 to 250 grams per liter, and recycling the kalimagnesia into step (a), (d) evaporating about 30 to 50% by weight, of the water in said mother liquors wherein 30 to 35% of the water is evaporated at a temperature of about 100° to 145° C. and about 5 to 15% of the water is removed by cooling under reduced pressure, thereby forming a precipitate of said intermediate mixed salt and an end liquor containing very little potassium chloride and about 400 to 460 grams per liter of magnesium chloride, (e) separating said intermediate mixed salt from said end liquor and recycling the mixed salt into step (b).

12. In a continuous process for the production of potassium sulfate by reaction of potassium chloride in aqueous solution with kalimagnesia, the improvement which comprises:
(a) reacting about one-third of the total amount of sulfate liquor which is obtained from an extraneous reaction of potassium chloride with kalimagnesia and subsequent separation of the resulting potassium sulfate from the reaction mass, with kieserite at a temperature of about 50 to 80° C., whereby a first portion of kalimagnesia and mother liquid are produced, (b) reacting the remaining portion of the aforesaid sulfate liquor with a mixture of one part by weight of epsomite and 1 to 1.4 parts by weight of an intermediate salt obtained in a previous run in step (e) below, at a temperature of about 40 to 60° C., whereby a second portion of kalimagnesia and mother liquor are obtained, (c) separating said portions of kalimagnesia from said mother liquors which have a magnesium chloride content of about 200 to 250 grams per liter, and recycling the kalimagnesia into step (a), (d) evaporating about 30 to 50%, by weight, of the water in said mother liquors wherein 30 to 35% of the water is evaporated at a temperature of about 100° to 145° C. and about 5 to 15% of the water is removed by cooling under reduced pressure, thereby forming a precipitate of said intermediate mixed salt and an end liquor containing very little potassium chloride and about 400 to 460 grams per liter of magnesium chloride, (e) separating said intermediate mixed salt from said end liquor and recycling the mixed salt into step (b).

13. In a continuous process for the production of potassium sulfate by reaction of potassium chloride in aqueous solution with kalimagnesia, the improvement which comprises:
(a) mixing 2500 parts by volume of an aqueous solution of potassium chloride containing 320 to 400 grams per liter with 1736 to 1850 parts by weight of kalimagnesia containing 23 to 29% water at a temperature of about 45° to 50° C., whereby 1060 to 1110 parts by weight of potassium sulfate and 2900 to 3300 parts by volume of sulfate liquor containing 214 to 230 grams per liter and 80 to 95 grams per liter of $MgCl_2$ are produced.

(b) reacting 900 to 1150 parts by volume of the aforesaid sulfate liquor with 254 to 313 parts by weight of kieserite at a temperature of about 60 to 70° C., whereby a first portion of kalimagnesia and a first mother liquor are produced, (c) reacting the remaining portion of the sulfate liquor with a mixture containing 1000 parts by weight of epsomite and 1000 parts by weight of an intermediate salt obtained in step (e) below, at a temperature of about 40° to 60° C., whereby a second portion of kalimagnesia and a second mother liquor are produced, (d) separating said portions of kalimagnesia from said first and second mother liquors, recycling said kalimagnesia into step (a) and combining said mother liquors, the combined mother liquors containing about 200 to 250 grams per liter of $MgCl_2$ and about 65 to 90 grams per liter of KCl, (e) evaporating about 30 to 35%, by weight, of the water in said combined mother liquors at a temperature of about 100° to 145° C., cooling the concentrated mother liquor under reduced pressure whereby another 5 to 10% by weight of water is removed and about 1000 parts by weight of a moist intermediate salt, containing about 20 to 35% by weight of water, is produced together with about 1167 to 1325 parts by volume of an end liquor containing about 400 to 460 grams per liter of $MgCl_2$, (f) separating said intermediate mixed salt from said end liquor and recycling the mixed salt into step (c), the relationship between parts by weight and parts by volume being the same as that between tons and cubic meters.

References Cited by the Examiner

UNITED STATES PATENTS 2,881,050  4/59  Autenrieth _____ 23—121 X
3,058,806  10/62  Ebner _____ 23—121

MAURICE A. BRINDISI, *Primary Examiner.*